US005546645A

United States Patent [19]

Baughman

[11] Patent Number: 5,546,645

[45] Date of Patent: Aug. 20, 1996

[54] MOUNTING TOOL FOR POLYCAP FENCE TOP

[76] Inventor: Gene A. Baughman, Rte. 1, 8516 Rd. 137, Paulding, Ohio 45879

[21] Appl. No.: 241,666

[22] Filed: May 12, 1994

Related U.S. Application Data

[63] Continuation of Ser. No. 962,336, Oct. 16, 1992, abandoned.

[51] Int. Cl.[6] ............................ B23P 19/04; B25B 33/00

[52] U.S. Cl. ................................ 29/235; 29/239; 81/485

[58] Field of Search ............................ 29/235, 239, 280; 81/485

[56] References Cited

U.S. PATENT DOCUMENTS

| | | |
|---|---|---|
| 892,287 | 6/1908 | Morse . |
| 1,508,695 | 9/1924 | Hill . |
| 1,765,240 | 7/1928 | Nichols . |
| 1,991,150 | 2/1935 | Hammon . |
| 2,826,394 | 3/1958 | Pinson . |
| 3,061,306 | 10/1962 | Magill . |
| 3,181,302 | 5/1965 | Lindsay . |
| 3,426,752 | 2/1969 | Laico . |
| 4,220,316 | 9/1980 | Naka et al. . |
| 4,291,454 | 9/1981 | Sawaryn . |
| 4,523,745 | 6/1985 | Killman et al. . |
| 4,982,932 | 6/1991 | Baker . |
| 5,098,225 | 3/1992 | Rockower et al. . |

FOREIGN PATENT DOCUMENTS

| | | | |
|---|---|---|---|
| 139910 | 3/1920 | France | 29/235 |
| 139910 | 3/1920 | United Kingdom . | |

*Primary Examiner*—Joseph M. Gorski

*Attorney, Agent, or Firm*—Cushman Darby & Cushman, LLP

[57] ABSTRACT

A mounting tool for mounting a tubular member to the top of a fence. The mounting tool includes a generally conically shaped main body member. The main body member includes a forward axial end of conical shape. A handle is mounted transversely to the mounting member. The handle is preferably mounted in a plane offset with respect to a vertical plane of symmetry of the main body member. The main body member also includes spreader wings which are adjustable to vary the amount of spreading of the tubular member and to accommodate tubes of different dimensions. The mounting tool is inserted into an end of the tubular member and is pushed or pulled through the tubular member to aid in mounting the tubular member to the top of a fence.

10 Claims, 4 Drawing Sheets

MOUNTING TOOL FOR POLYCAP FENCE TOP

This is a continuation of application Ser. No. 07/962,336, filed on Oct. 16, 1992, which was abandoned upon the filing hereof, application Ser. No. 08/241,666 filed May 12, 1994.

BACKGROUND OF THE INVENTION

1. Field of the Invention

The present invention relates to mounting tools and, in particular, to a tool for mounting an elongated tubular shield to the top of a fence.

2. Description of the Related Art

Fields and yards are often delineated with fences. Typically, chain link fencing is used to enclose recreational fields. A problem experienced, in particular, with chain link fences, but also with other types of fencing, is that the free upper edge of the fence represents a potential source of injury to athletes and other individuals recreating in the vicinity of the fence. Indeed, a forceful encounter with the upper edge of such a fence can tear uniforms and clothing, and/or lacerate, bruise or cause even more serious injury.

To minimize the likelihood that an athlete, for example, will be injured should he or she run or be knocked into a perimeter fence, the inventor has previously proposed to mount a longitudinally slit, relatively rigid polymeric tube to the top of fences surrounding playing fields, in particular. Because of the rigidity and length of the protective polymeric tube (hereinafter referred to as a polycap tube), however, mounting the polycap tube to the top of the fence has been problematic.

SUMMARY OF THE INVENTION

Thus, it is an object of the present invention to provide a tool for enabling a polycap tube to be mounted to a fence top with relative ease.

It is a further object to provide such a mounting tool which dilates the polycap tube to thereby widen the gap defined by the slit to allow insertion of the fence without permanently deforming the polycap tube, so that the tube can nevertheless be securely disposed atop the fence.

It is yet a further object of the invention to provide such a dilating mounting tool which is moved axially of the mounting tube so as to sequentially dilate segments of the tube of sufficient length to allow a gradual and sequential mounting of the tube to the fence, thereby to minimize the size of the tool and manpower required to use the same. The tool includes a generally conically shaped main body member. The main body member has a longitudinal axis and a vertical plane of symmetry. A handle is coupled to the main body member in such a way that at least a substantial portion of the handle is laterally offset from the plane of symmetry of the main body member. The handle is transversely attached to the longitudinal axis of the main body member.

As the tool is advanced along the length of the tube, the portions of the tube which are sequentially upstream of the tool return to their preformed configuration, thereby to be securely disposed upon the top of the fence.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY PREFERRED EXEMPLARY EMBODIMENTS

Figure 2:
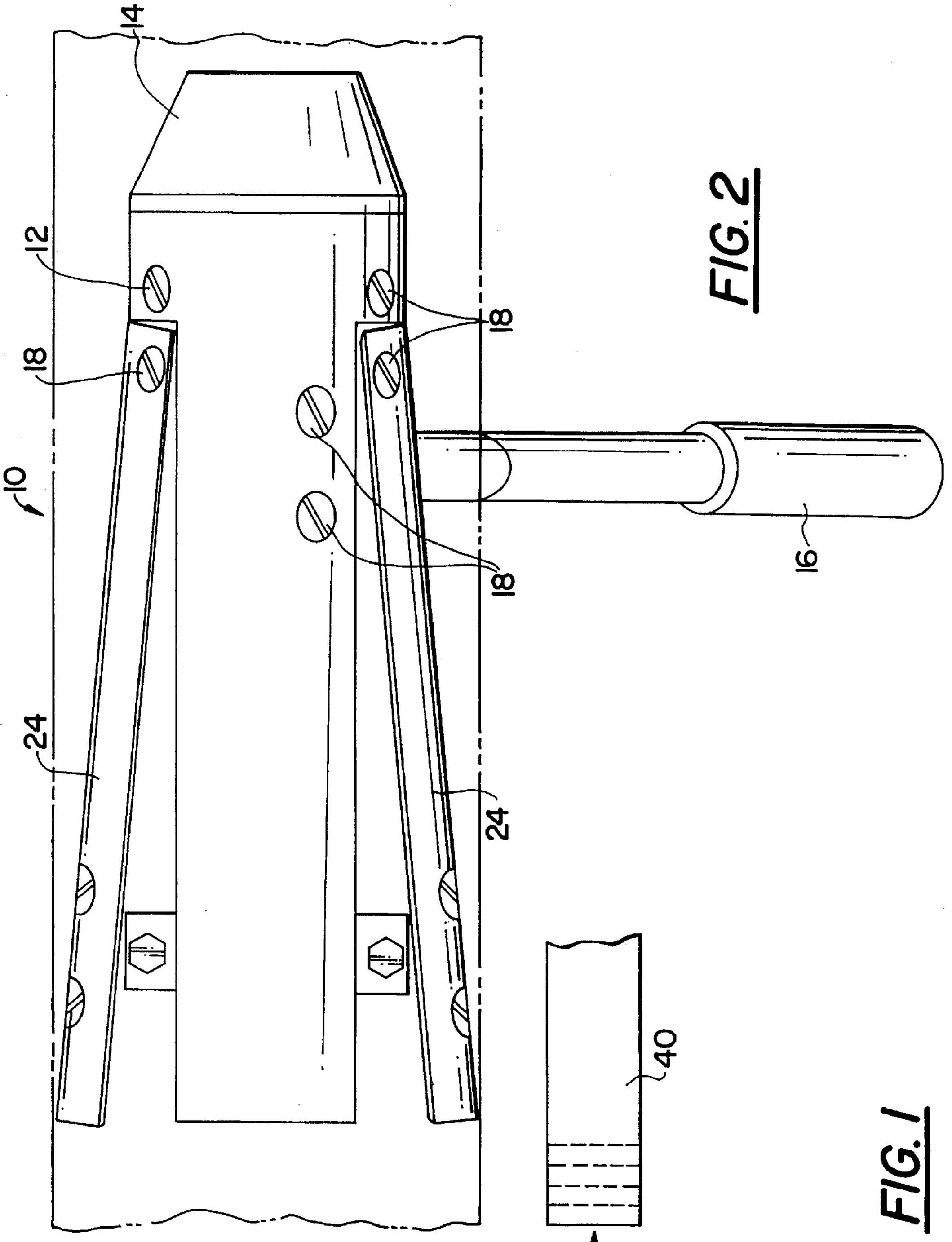
FIG. 2 is a top view of the mounting tool.
Figure 1:
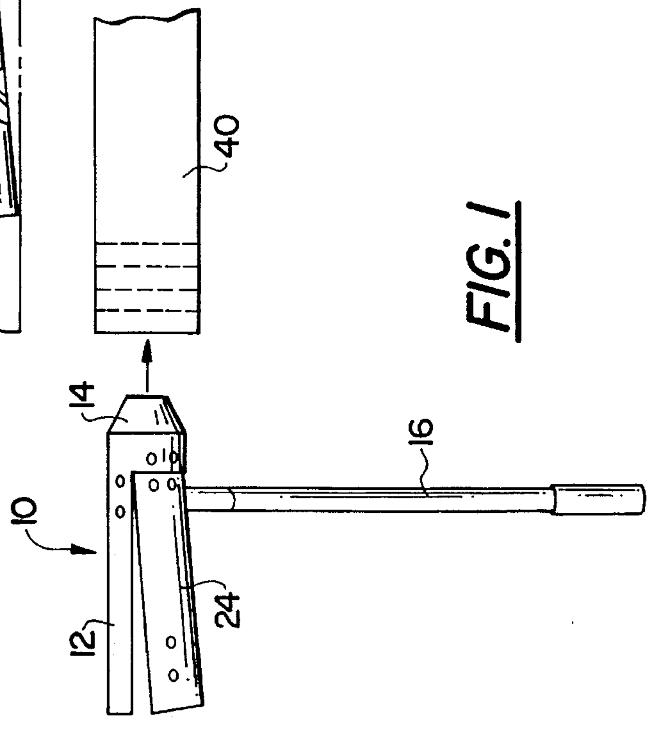
FIG. 1 is a perspective view of the mounting tool prior to insertion into a polycap tube.

A polycap fence top mounting tool in accordance with the present invention is shown by way of example in FIG. 1. The mounting tool 10 includes a generally cylindrical shaped mounting tool portion 12. The front axial end 14 of the mounting tool 10 has a generally rounded, conical configuration.

Figure 3:
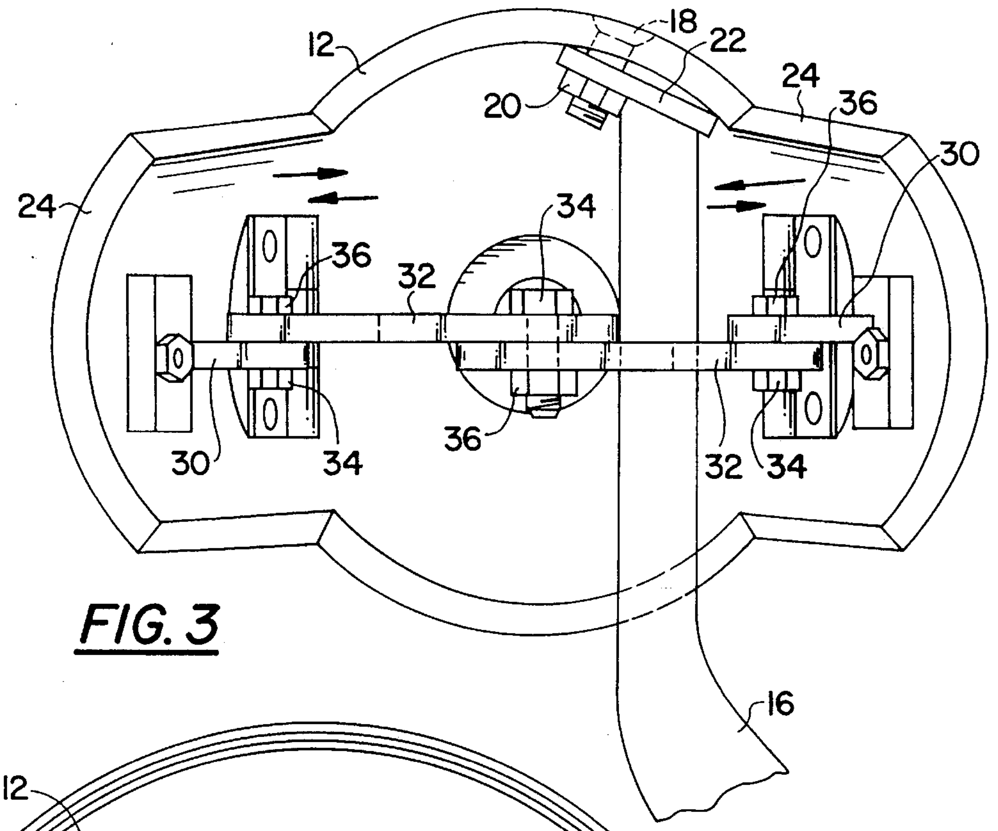
FIG. 3 is a rear elevational view of the mounting tool.
Figure 4:
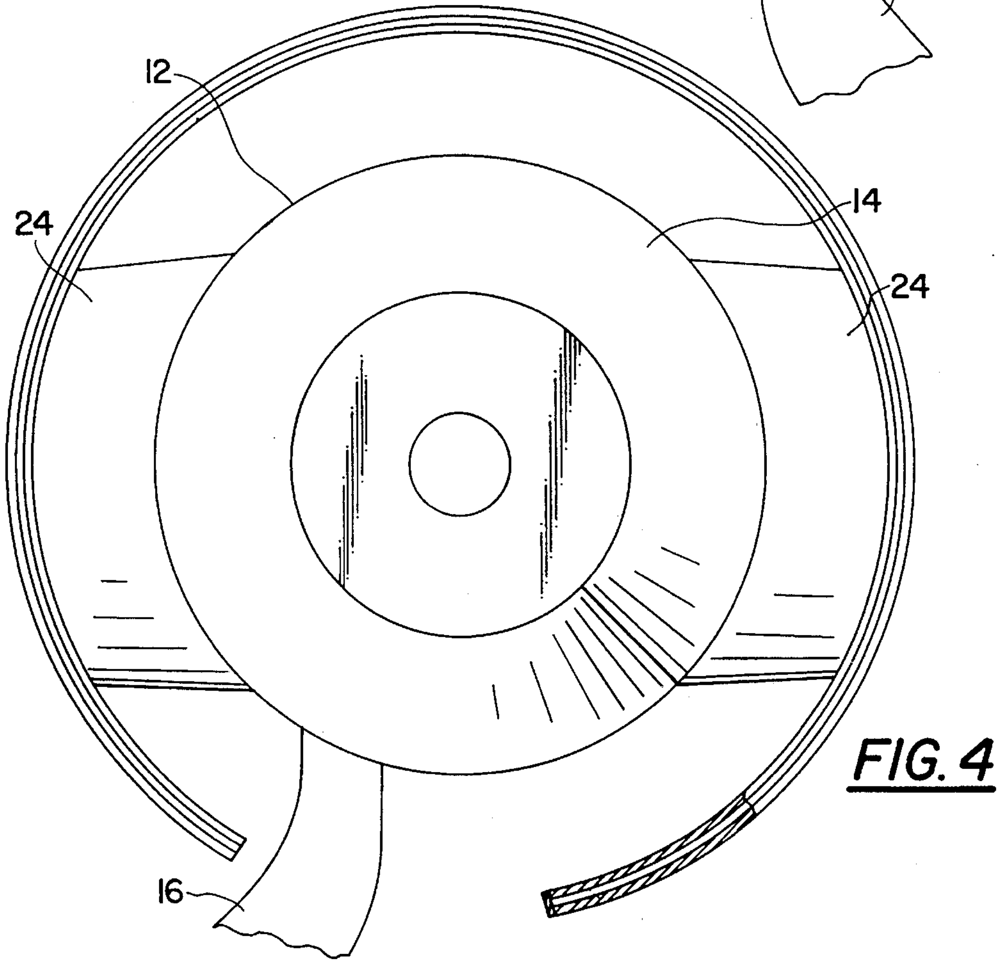
FIG. 4 is a front elevational view of the mounting tool.
Figure 5:
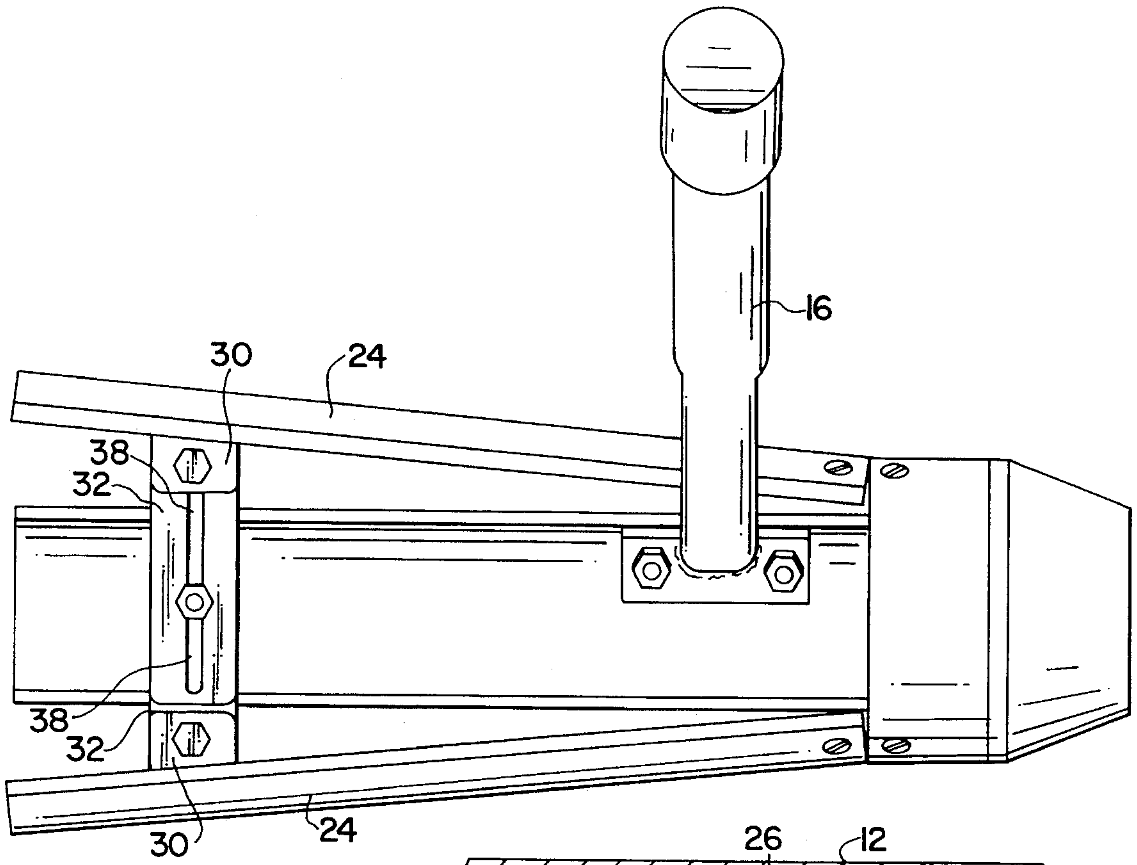
FIG. 5 is a bottom plan view of the mounting tool.

A handle 16 is mounted transversely to a longitudinal axis of the mounting tool 10. As shown in FIG. 3, the handle 16 may be mounted to the cylindrical portion 12 of the mounting tool 10. In the illustrated embodiment, the handle 16 is attached to the cylindrical portion 12 through the use of a pair of threaded screws 18 and nuts 20 which pass through a bore (not shown) in a flanged portion 22 of the handle 16.

Figure 6:
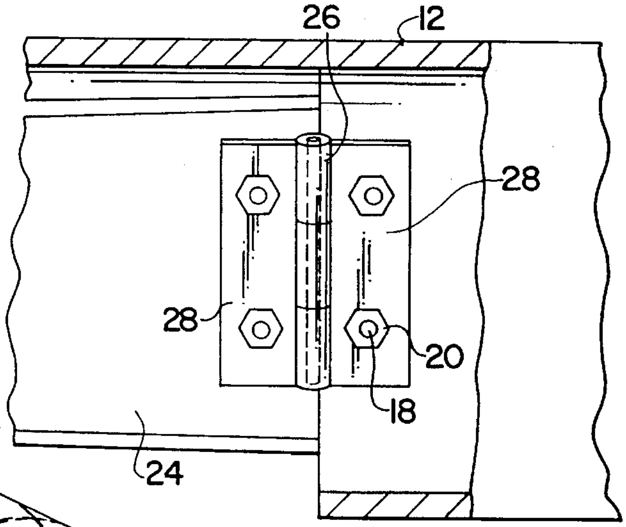
FIG. 6 is an enlarged partial view of the hinged connection for the wings of the mounting tool.

The mounting tool 10 includes a pair of adjustable wings 24. The wings are hingedly connected to the cylindrically shaped portion 12 of the mounting tool 10 by a hinge 26, as shown in FIG. 6. Hinge plates 28 are mounted to the cylindrical portion 12 and the wings 24 by a screw 18 and a nut 20 arrangement similar to that used to mount the handle 16 to the cylindrical portion 12.

Each wing 24 includes a plate 30 that extends inwardly from the inner periphery thereof. Plates 30 are each connected to a respective second plate 32 by a bolt 34 and a nut 36. Each plate 32 has a longitudinal slot 38 to receive a bolt 34 which adjustably connects the two plates 32 and thus the two wings to each other. By adjusting the connection between the two plates 32, the position of the wings 24 can be modified, thereby to determine the dilation effected by the tool, as described below.

Figure 7:
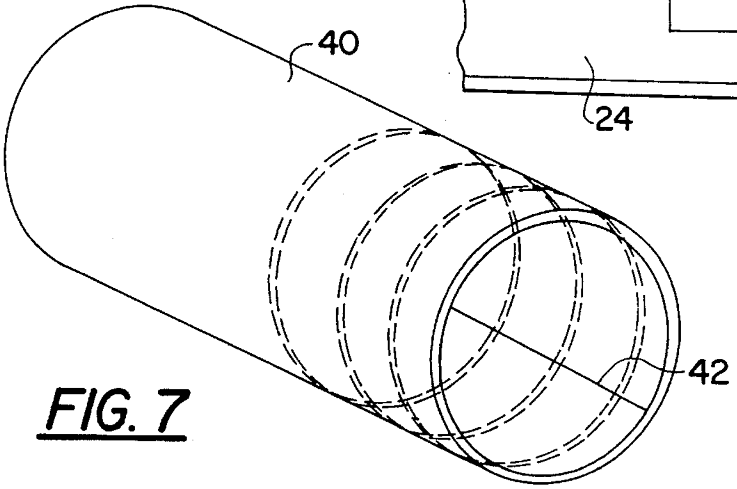
FIG. 7 is a perspective view of a polycap tube.
Figure 8:
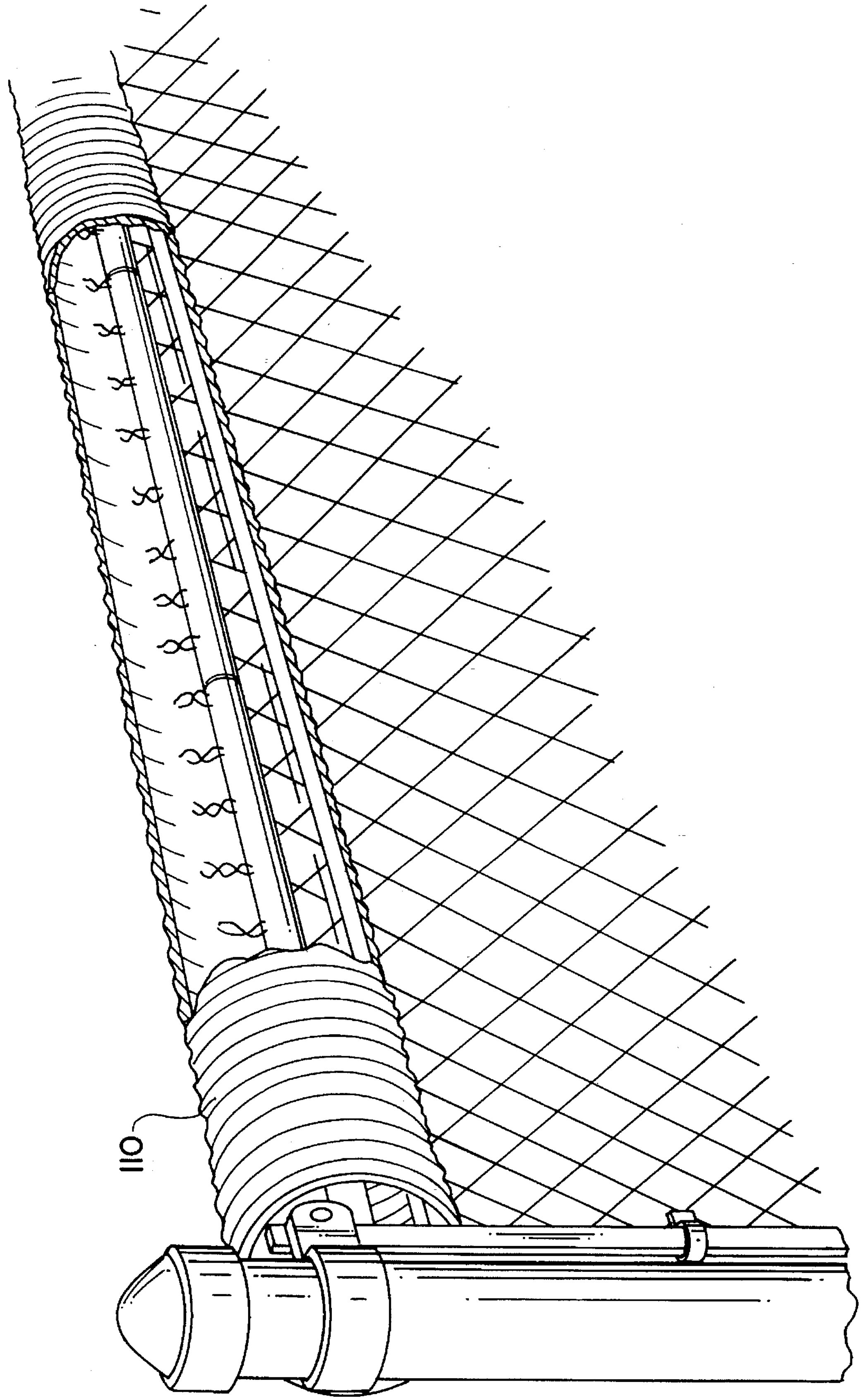
FIG. 8 is a perspective view of the split polycap tube mounted to the top of a chain link fence.

FIG. 7 shows a portion of a polycap tube 40. To permit the polycap tube 40 to be spread and mounted to a fence, a longitudinal slit 42 is made, in any suitable manner, through the tubular wall of the polycap tube 40, as shown in FIG. 7. The polycap tube 40 is preferably formed from a rigid plastic material, similar to that which is used for a drainage tube. In the illustrated embodiment, the tubing is undulated or corrugated.

During operation, the position of the adjustable wings 24 of the mounting tool are set to spread a polycap tube 40 by a predetermined amount, as necessary to place the tube over the top of the fence. The forward end of the mounting tool is then inserted into one end of the polycap tube 40. The thus spread polycap tube 40 is disposed to overlay and receive the fence top. The mounting tool is then gradually passed through the polycap tube to sequentially, temporarily spread axial portions of the tube. Whereby the polycap tube can be gradually received on the fence top.

The handle 16 of the mounting tool is designed to be off center from the longitudinal axis of the mounting tool so that the handle does not come into contact or interfere with the fence as the tool is being pushed and/or pulled along the longitudinal axis of the polycap tube. Thus, as the mounting tool passes through the polycap tube, the polycap tube 40 can then be easily mounted to the top of the fence, as shown in FIG. 9. Once each portion of the tube has been spread and mounted, further sliding of the tool to a tube portion remote from the thus mounted segment allows the mounted tube to return to its original configuration, thus gripping and being retained on the fence. Securement of the polycap tube can be augmented by the provision of coupling elements (not shown) which secure the edges of the slit to each other through the fence.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims. Thus, while the tube has been characterized as preferably formed from rigid plastic because of its toughness and resilience, other materials or combinations of materials may be used. Also, while the mounting tool is preferably made of metal, other materials or combinations of materials may be used. Further, although the illustrated tool has a transverse hand, in some instances it may be possible to omit the handle and provide a suitable pull line to axially pull the tool through the tube.

What is claimed is:

1. A mounting tool comprising:

a main body member having distal and proximal ends, a longitudinal axis and a vertical plane of symmetry containing said longitudinal axis, said distal end being spaced from said proximal end along said longitudinal axis;

at least two spreader wings each having distal and proximal ends spaced along said longitudinal axis, said distal end of each spreader wing being hingedly attached to said main body member so that said proximal end of each spreader wings is movable with respect to said longitudinal axis; and a handle immovably coupled to said main body member so as to be immovable with respect to said main body member, said handle extending generally transversely to said longitudinal axis between said distal end of each spreader wing and said proximal end of said spreader wings, at least a substantial portion of said handle being laterally offset from said vertical plane of symmetry.

2. The mounting tool as in claim 1 further comprising means for varying a distance between said at least two spreader wings.

3. The mounting tool as in claim 2 wherein said distal end of said main body member is of rounded shape.

4. The mounting tool as in claim 1 wherein said distal end of said main body member is of rounded shape.

5. The mounting tool as defined in claim 1, wherein said spreader wings are disposed symmetrically with respect to said vertical plane of symmetry of the main body member, and wherein said handle extends at least from between said spreader wings to a point spaced from and beyond an extent of said spreader wings.

6. The mounting tool comprising:

a main body member having a longitudinal axis and distal and proximal ends, said distal end being spaced from said proximal end along said longitudinal axis, a portion of said distal end being generally conically shaped; and at least two spreader wings each having distal and proximal ends spaced along said longitudinal axis and each being hingedly attached at the distal end thereof to said main body member so that said proximal end of each spreader wings is movable with respect to said longitudinal axis; and a handle immovably coupled to said main body member so as to be immovable with respect to said main body member, said handle extending generally transversely with respect to said longitudinal axis of said main body member between said distal end of each spreader wing member and said proximal end of each spreader wing.

7. A mounting tool as in claim 6 further comprising means for varying a distance between said at least two spreader wings.

8. The mounting tool as in claim 7 wherein at least a substantial portion of said handle is laterally offset from a vertical plane of symmetry containing said longitudinal axis of said main body member.

9. The mounting tool as in claim 6 wherein at least a substantial portion of said handle is laterally offset from a vertical plane of symmetry containing said longitudinal axis of said main body member.

10. A mounting tool as defined in claim 6, wherein said handle extends at least from between said spreader wings to a point spaced from and beyond an extent of said spreader wings.

* * * * *